United States Patent Office 2,971,880
Patented Feb. 14, 1961

2,971,880
RUST ERADICATION

Harry L. Keil, Philadelphia, and Hans P. Frohlich, Newtown, Pa., assignors to Rohm & Haas Company, Philadelphia, Pa., a corporation of Delaware No Drawing. Filed Jan. 30, 1958, Ser. No. 712,088

21 Claims. (Cl. 167—14)

This invention relates to methods and compositions for eradicating various rust infections on plants, particularly on edible plants. More particularly it relates to the selective destruction or physiological impairment of one or more of the life processes in vegetative or fruiting parts of the rust pathogen infecting cereal crop plant tissue without impairing the life processes of the plant host. Furthermore, substantial protection against re-infection is also afforded with preferred embodiments of the present invention.

The economic losses due to rust infections run into millions of dollars every year, with wheat rust causing the greatest financial loss. Rust infection of wheat plants results in several undesirable effects, all of which adversely affect the yield and quality of the grain produced. First, the rust kills many of the cells of the host plant and uses their food content for its own growth; second, the rust robs the host of foods which would otherwise be used for growth in parts other than those in which the rust occurs; third, as a result of killing certain of the host cells, the photosynthetic activity of the host plant is greatly reduced. The rust-infected plant is therefore stunted and pale green, it ripens prematurely, and the small shrunken kernels which it bears are frequently not worth harvesting. In addition, because of weakened stem structure, the rust-infected plant is more susceptible to wind damage with accompanying difficulties and loss of yield on mechanical harvesting. It is estimated that the production of durum wheat, a hard variety prized for macaroni production, has declined to approximately 15% of former production because of its rust susceptibility. The black stem wheat rust epidemic of 1916 was particularly destructive and according to one of the principal authorities on cereal rusts, the loss of wheat that year in the United States and Canada was conservatively estimated at 280,000,000 bushels.

Three basic methods have been employed with the hope of decreasing losses due to rust infection; none have shown total success to date. In the northern cereal belt, the barberry plant was known to be an alternate host for rust which permitted the wheat rust organism to overwinter on it to complete its life cycle and thereby producing spores for reinfection of the wheat crop early in the next spring or summer. Barberry eradication programs, although very costly, were undertaken, but failed because of the rust infection of northern plants by airborne spores from the south. Some degree of initial success was achieved in the breeding of new rust-tolerant strains, but the rate of mutation of the rust pathogens exceeded the plant breeder's ability to produc new rust-tolerant strains. Numerous chemical methods of preventing rust infection, i.e., protecting against infection, such as dusting with sulfur, etc., have been tested, but the results were variable and the methods expensive and impracticable. Although there have been attempts to eradicate existing rust infections, no successful method has heretofore been devised without undesirable side effects.

The rusts are members of the Basidiomycetes class and include many genera and species, one or more of which lives upon almost every species of seed plant as well as upon some of the ferns. Every rust produces spores of at least two distinct types, and some have three, four, or even five different kinds of spores. Well-known diseases of economic plants are caused by various rusts on wheat, oats, barley, rye, asparagus, apple, raspberry, blackberry, beans, and various arbor-vitae and pines. The spread of rust is dependent on atmospheric conditions. It is favored by warm, moist, cloudy weather. Hot, dry, clear weather, on the other hand, checks its spread because the spores require considerable moisture for germination and because hyphae growing from the spores will not long withstand the heat of the sun's rays.

Considering wheat rusts as a typical example, the stems and leaves of wheat plants infected by rust often bear powdery masses whose reddish color suggests the name "rust." Such a mass consists of innumerable small, orange-red, two nucleate uredospores. The spores appear first in late spring and their production continues until the plant matures. The spores may spread by various means, especially by winds, to other wheat plants. When a uredospore falls on a growing wheat plant, it germinates, sending out a germ tube which, on reaching an opening in the wheat leaf or stem, grows into the intercellular spaces of the subcuticular tissue. Here the germ tube develops into a multibranched mycelium. As the mycelium develops, the growth and repeated branching give rise to compact masses of pathogenic cells at certain spots immediately beneath the epidermis of the host plant. Spores develop on the fruiting branches of the mycelia and finally the epidermis ruptures, exposing the mass of spores. Since these spores are capable of reinfecting the host, or of infecting other wheat plants, and grow rapidly in large numbers, a field of wheat, once infected, can become infected to a serious degree in a short period of time providing optimum environmental conditions are present.

An obvious method of controlling rust infection would be to coat the infectable parts of the plant to be protected with a compound which would kill any spores subsequently deposited on the coating and thus prevent infection of the plant. There are several commercially available products which, if applied at the appropriate stage of growth and not subsequently washed off by rain, will prevent infection of plants by rust. Such products, if applied as a dust or as a spray prior to infection, are known as the "protectant" type.

However, the application of any agricultural chemical on a large scale is expensive, and, the rate and ultimate extent of rust infection varies from year to year. Thus, there are years in which rust infection is negligible and also years in which the degree of infection is not sufficient to warrant the expense of protective chemical treatment.

The ideal controllant would be a compound which, when applied to the above-ground portions of plants susceptible to rust infection, would eradicate any existing infection, prevent spore development in existing infections, and prevent further infection by other spores which might contact the plants at a later date. Since a low degree of infection can be tolerated without serious loss of yield, it is not necessary that the infection be eradicated completely; only that a controllable eradication be effected. With such an "eradicant" type controllant available, a grower, on determining the degree of infection present in a given crop, could decide whether or not it was economically sound to spray the fields and thus prevent further spread of infection with resultant yield loss due to rust. If it is possible to eradicate the rust infection at the stage where the rust first becomes visibly evident, there will be essentially no impairment of quality or yield of the cereal grain. With the "protectant" type of controllant, however, the plants should be contacted before the initial rust infection, and, if subsequent conditions are not conducive to the development of the infection, the treatment represents a needless financial expenditure to the grower.

There are two possible methods of utilizing compounds for the control of pathogens on plants. One is the systemic method which depends on the assimilation of the compound through the roots of the plant and eventually throughout the interior structure of the plant itself. While this method can be used for some high price crops or in greenhouse horticulture, generally the utilization of the compounds is inefficient and the method of application expensive. The contact method is more generally employed and consists in application of the pathogen-controlling composition by spraying a solvent solution or aqueous solution or dispersion of the compound onto the plant host. Dusting with dry powders also constitutes another contact method. Considering the accepted method of planting most cereal grains, and particularly in view of the acreage generally involved, application of the compound by dust or spray by aerial methods would be most advantageous.

Surprisingly, it has been found, in accordance with the present invention, that nickel compounds as hereinafter defined, function not only as rust protectants but also as rust eradicants when applied to the above-ground portions of plants by contact application. Particularly in the case of rust-infected cereal grains, these nickel compounds effect the selective destruction of life processes in vegetative or fruiting parts of the rust pathogen located in or on the cereal crop plant tissue without impairing the life processes of the uninfected tissue. Furthermore, these nickel compounds prevent reinfection of the treated plants by other rust spores.

It is postulated that this specific destruction of the rust pathogen without adverse effects on the life processes of the uninfected tissue of the plant host is effected by the nickel ion when it is absorbed by the rust pathogen. Rain tests shortly after the application of nickel compounds have shown that the nickel ion is absorbed rapidly and that eradication occurs even if the nickel compound on the surface is washed off and thus cannot afford subsequent protection. Thus it is true that any nickel compound which will supply nickel ion will effect some degree of rust eradication. Other factors which must be considered in choosing suitable nickel compounds such as tenacity, chemical stability under field conditions, phytotoxicity, etc., are discussed hereinafter.

In general sufficient nickel compound to provide from about 0.02 pound to about 4 pounds of nickel expressed as nickel metal per acre of regularly planted plant host will effect eradication of existing rust infections. Preferred nickel compounds effect optimum treatment when supplied in an amount sufficient to provide up to about 0.5 pound of nickel expressed as nickel metal per acre of regularly planted plant hosts.

There are a large number of factors which affect the effectiveness of nickel compounds used for rust eradication such as nature of plant host, kind of rust, stage and/or degree of rust infestation, water balance of plant, environmental conditions at time of application of nickel compound, etc. Thus, as in the case of all other pathogenicides, the overall impact of all these factors must be assessed at the time of application, and the most suitable nickel compound and vehicle for its application chosen on the basis of this assessment.

Thus for rust eradication on plant hosts growing in arid areas, i.e., where there is normally very little rainfall during the growing period, inorganic nickel salts of moderate to high solubilities, i.e. with a minimum solubility of 1.0 g./100 ml. water can be successfully employed. They may be applied by spray as the aqueous solution with or without added surfactants as hereinafter described. In other areas wherein higher rainfall is encountered during the growing season, these same salts may be employed for effective eradication, but the protectant action will be decreased if it rains subsequent to the application of the nickel compound to the plant. However, as described hereinafter, the wash-off of the protectant nickel compound can be very appreciably decreased by compounding with an adherent or sticking agent. Typical of this class of nickel compounds are the following:

Nickel fluoride
Nickel chloride
Nickel bromide
Nickel iodide
Nickel chloride ammonia
Nickel bromide ammonia
Nickel iodide ammonia
Nickel sulfate
Nickel ammonium sulfate
Nickel nitrate
Nickel ammonium nitrate
Nickel ammonium chloride
Nickel selenate
Nickel chlorate
Nickel iodate
Nickel sulfamate
Nickel fluoborate Relatively insoluble inorganic nickel salts, i.e., those which have a solubility less than 1.0 g./100 ml. of water are also effective for rust eradication. Because of their lower solubility, they exhibit better tenacity, and thus would be indicated particularly for use in growing areas in which the rainfall is relatively high. These compounds may be employed in dusting powders in conjunction with inert carriers as described in greater detail hereinafter. When finely ground, they may be employed as aqueous suspensions, optionally with either surfactants or dispersing agents as described hereinafter. In areas where high or persistent winds are frequently encountered, adherents or sticking agents to increase their adhesion to the plants are frequently used in conjunction therewith. Typical of this class of compounds are the following:

Nickel carbonate
Basic nickel carbonate
Nickel sulfide
Nickel cyanide
Nickel hydroxide
Nickel phosphate
Nickel selenide
Nickel sulfite Another class of nickel compounds which have been proven to be effective for rust eradication when applied at low dosages are the nickel salts in which the anion is derived from lower molecular weight organic acids, such as fatty acids, hydroxy acids, unsaturated fatty acids, halogen substituted fatty acids, thio-acids, particularly organic acids containing up to about 6 carbon atoms. The same limitations apply to the salts of this group which exhibit relatively high solubilities, i.e., they are preferably applied in combination with adherents or sticking agents. The higher molecular weight members of the group, i.e., those containing from 4 to 6 carbon atoms, exhibit improved tenacity. Typical of this class of compounds are the following:

Nickel formate
Nickel acetate
Nickel propionate
Nickel citrate
Nickel glycinate
Nickel acrylate
Nickel methacrylate
Nickel sulfanilate
Nickel tr Nickel salts of higher fatty acids, i.e. fatty acids containing more than 6 carbon atoms, are essentially insoluble, and frequently are somewhat resinous in nature. They exhibit excellent rust eradication, and because of their general properties, exhibit good tenacity in the sense of permanence to rain wash-off, and also to removal from the plant host by wind. In general, it is not necessary to use an adherent or sticking agent in conjunction with these compounds, and very effective compositions can be prepared by dissolving said nickel compounds in non-phytotoxic solvents to prepare concentrated solutions. If surfactants are added to these concentrated solutions, it is possible to prepare self-emulsifying concentrates which will form very suitable emulsions upon addition to water. Because of the waxy or oily nature of some of these compounds, the preferred embodiments include surfactants in order to improve spreading and wetting characteristics. Typical of such compounds are the following:

>   Nickel rosinate
>   Nickel naphthenate
>   Nickel oleate
>   Nickel linoleate
>   Nickel azelate
>   Nickel sebacate
>   Nickel caprylate
>   Nickel pelargonate
>   Nickel laurate
>   Nickel myristate
>   Nickel palmitate
>   Nickel margarate
>   Nickel stearate While, in general, the nickel compounds listed above are prepared using the individual fatty acids, suitable compounds can be prepared from the mixed fatty acids obtained by the saponification of naturally occurring glycerides. Thus, the fatty acids obtained from the saponification of coconut oil, soybean oil, linseed oil, tallow, are all suitable raw materials for the preparation of effective higher fatty acid nickel compounds.

Nickel forms a large number of complex addition products with a variety of organic compounds, most of which complexes are essentially insoluble in water. A broad spectrum of such nickel complexes has been evaluated for rust eradication purposes with excellent results. A preferred class of compounds are those formed by the interaction of water-soluble inorganic nickel salts with certain high molecular weight aminoalcohols. Typical of this class of compounds are the following:

Bis[N-(2-hydroxythyl)dodecylmethylbenzylamine] nickel II chloride
Bis[N-(2-hydroxyethyl)5,5,7,7-tetramethyl - 2 - octenyl amine] nickel II chloride
Bis[N,N-di(2-hydroxyethyl)5,5,7,7-tetramethyl - 2 - octenylamine] nickel II chloride
Bis[N,N-di(2 - hydroxyethyl)dodecylmethylbenzylamine] nickel II chloride
Bis[di(dodecylmethylbenzyl) - 2 - hydroxyethylamine] nickel II chloride
Bis[N-(2-hydroxyethyl)dodecylbenzylamine] nickel II chloride This class of aminoalcohol nickel salt complexes can be represented by the following structural formula:

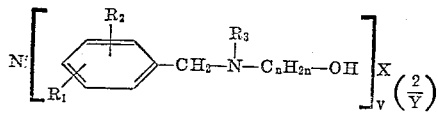

in which $R_1$ is alkyl containing from four to eighteen carbon atoms, $R_2$ is selected from the group consisting of hydrogen and lower alkyl, $R_3$ is selected from the group consisting of hydrogen and lower alkyl and 2-hydroxyethyl, X is an anion, $n$ is 2 to 3, Y is the valence of the anion X, and V is an integer of from 1 to 2, i.e., 1 or 2.

The preparation of the metal salt complexes of these higher molecular weight aminoalcohols can be carried out using any one of several methods including the following methods:

(a) Adding a solution of a nickel salt to a solution of the aminoalcohol in an inert organic solvent.
(b) Mixing a nickel salt and the aminoalcohol without the use of solvent (when aminoalcohols are liquid).

The products obtained by method (a) vary in physical form depending on the particular amine and nickel salt employed. In some cases precipitates form on mixing the reactants. These can be removed by filtration and dried. In other cases the complexes are soluble in the solvent used and the solid complexes can be obtained by evaporation of the solvent. In those cases in which the solvent employed is non-phytotoxic, the solution as such can be employed as the essential ingredient of compositions for rust eradication.

Method (b) generally produces oils or mixtures of oils and crystals which can be dissolved in any suitable non-phytotoxic solvent, emulsified in water, or compounded into dusts for use.

The preferred method of preparation of the above methods is method (a) in which the amine is dissolved in a lower alkanol, the metallic salt is dissolved in a lower alkanol, and the two alcoholic solutions are mixed. Preferred lower alkanols are methanol, ethanol and propanol. The order of addition is not critical, and although the complexes will form at room temperature, the reaction is favored by a moderate amount of heat. Relatively high temperatures are to be avoided, however, since there is an undesirable tendency toward breakdown of the complexes at elevated temperatures.

Although the molar ratios of the metallic salt to the aminoalcohols can be varied widely and still produce the products of the invention, the preferred ratio is one mole of metallic salt to one or two moles of the aminoalcohol, the latter being determined by the value of V.

Typical preparations of several of these aminoalcohol nickel salt complexes are hereinafter described.

Another class of nickel compounds which have been found to be suitable for rust eradication are generally known as coordinate complexes and are prepared by interaction of inorganic nickel salts and organic monoamines. Typical of this class of compounds are the following:

Tetraammino nickel II chloride
Tetra(ethylamine) nickel II nitrate
Tetra(undecylamine) nickel II chloride
Bis[N-(2-hydroxyethyl)methylamine] nickel II sulfate
Bis[N,N-bis(2-hydroxyethyl)phenylamine] nickel II chloride
Bis[N-(2-hydroxyethyl)dodecylamine] nickel II nitrate
[N,N,N',N' - tetra(2 - hydroxyethyl)ethylenediamine] nickel II sulfate
Bis(methyl 3-octylaminopropionate) nickel II chloride
Bis(ethylenediamine) nickel II nitrate
Bis(diethylenetriamine) nickel II sulfate
Bis[N,N'-(3-aminopropyl)ethylenediamine] nickel II nitrate
Bis(N,N'-dioctylethylenediamine) nickel II chloride
Bis(N,N'-diphenylethylenediamine) nickel II bromide
Bis(diacetoneamine) nickel II nitrate
Bis[2-(2,4-dichlorophenoxy)ethylamine] nickel II sulfate In addition to the aminoalcohol complexes previously described, nickel salts form complexes with a wide variety of other organic compounds. Representative compounds from numerous classes have been tested for rust eradication and all have proven to be effective. Many of the more insoluble of these compounds will not give effective rust eradication when applied at lower dosages (e.g. 0.25–0.5 pound of nickel complex per acre), but satisfactory eradication can be obtained when the dosage is increased to values in the range of about 2 to about 6 pounds per acre. In such cases, the economics of the use of these insoluble complexes must be carefully assessed. Representative members of this group of complexes are the following:

Nickel ethylenebisdithiocarbamate
Nickel 8-hydroxyquinolinate
Bis(kojato) nickel II
Bis(salicyl aldehyde) nickel II
Nickelous β-(ethylenethioureido) ethyldithiocarbamate
Nickelous β-4-chloroanilinomethanesulfonate
Nickelous α-carboxymethylmercapto-β-(2-furyl) acrylate
Bis(ethyl acetoacetato) nickel II
Tris(thiourea) nickel II chloride
Bis(acetylacetono) nickel II
Bis(2-hydroxydecanato) nickel
Bis(aminotriazole) nickel II chloride
Bis(dinitrocresolato) nickel II
Nickel bis(2,4-dichlorophenoxyacetate)
Bis(2-heptadecylglyoxalidine) nickel II chloride
Nickel bis(thiophenolate)
Bis(cyclopentadienyl) nickel
Nickel salt of bis(4-chloro-2-hydroxyphenyl) sulfide Nickel compounds prepared by the interaction of soluble inorganic nickel salts with polymeric water soluble or colloidally dispersible polymeric acids can be effectively used for rust eradication. Many of these nickel compounds, such as those prepared from a wide range of molecular weights of polyacrylic or polymethacrylic acids have, by virtue of their polymeric nature, effective "built-in" stickers. The very low molecular weight salts of this type will exhibit water solubility or water dispersibility, whereas the higher molecular weight salts are essentially insoluble in water. These can be dispersed by the use of suitable dispersing agents or surfactants. Other polymeric materials containing acidic groups, such as copolymers of vinyl compounds with acrylic or methacrylic acids, copolymers of vinyl compounds with maleic anhydride, can be employed as effective sources of nickel for rust eradication.

The tenacity or degree of retention on the plant of the nickel compound which have been applied to the plant host is a very important factor, not only from the standpoint of determining the effectiveness of the eradicant and protectant action of the nickel compounds, but also from the standpoint of insuring the most economical use of said nickel compounds. Laboratory tests, using a simulated rainfall applied to the plant very shortly after contacting the rust infected plane with the nickel compound, have shown that there appears to be rapid absorption of the nickel compound, almost instantaneously at the time of contact. It is true, however, that highly soluble nickel compounds would be washed off the plant host if there were rainfall shortly after application, and it also follows that maximum absorption of the nickel compound by the plant could not then occur, and there would be no remaining surface deposits of the nickel compound to act in a protectant fashion, i.e., prevent reinfection of the plant host by rust spores which might subsequently be deposited thereon. Thus, since protectant action is also desired, and since maximum efficiency in the utilization of the nickel compound is also required for economic reasons, in practice it is preferred to use additives with the nickel compounds, and these additives are classed as adherent or sticking agents. Tests have shown that these agents do not interfere with the availability of the nickel compound for eradicant and/or protectant purposes, but they do decrease substantially wash off of the nickel compound by rain, or the dislodging of the nickel compounds by wind, and thus prolong the controllant action of the nickel compounds. Water soluble gums such as starch, melamine formaldehyde condensates and the like function in this manner, although glycerol will also improve the tenacity of nickel compounds. Numerous polymer latices or aqueous dispersions, particularly those in which the polymers per se exhibit some degree of tack, will also function effectively as adherent or sticking agents. Typical of such compounds are homo-, co-, or terpolymers of a wide variety of vinyl monomers, particularly combinations of acrylate and methacrylate esters, vinyl acetate, vinyl chloride, styrene, butadiene, isoprene, etc. Terpolymers containing acrylate and methacrylate esters and a minor proportion of acrylic and methacrylic acids are also very effective.

One class of compounds in particular, the metal salts of alkylenebisdithiocarbamic acid, have given excellent results as adherent agents in conjunction with the nickel compounds. Examples of suitable metal salts include those of zinc, ammonium, manganese, and iron, and, depending on the particular conditions encountered, mixtures of these salts may function better. Combinations of these metal salts with nickel compounds, i.e., nickel compounds other than nickel alkylenebisdithiocarbamate may be employed as dusts, as dispersions in solvents or in aqueous media. When such combinations are employed, the nickel compound content thereof (expressed as nickel metal) should be at least 0.5% by weight and may be as high as about 95% by weight.

A preferred method of preparing an admixture of a nickel compound with a metal salt of alkylenebisdithiocarbamic acid when one of the materials is water-insoluble, is to dissolve the soluble material in an aqueous slurry of the insoluble material, spray dry the slurry, and micropulverize the dry powder so obtained. Excellent homogeneity is thereby obtained with resultant more effective use of both materials.

Tests have proven that the compounds, e.g., zinc ethylenebisdithiocrabamate, are effective as protectants against rust infection. Thus, a further advantage of the above described compositions is that additional protectant action is afforded by the metal salt of alkylenebisdithiocarbamic acid.

In general sufficient nickel compound to provide from about 0.02 to 4.0 lb./acre of nickel expressed as nickel metal in combination with from about 1 to 20 lb./acre of the metal salt of alkylenebisdithiocarbamic acid will provide effective rust eradication and subsequent protection. A preferred dosage for optimum protection under normal conditions is sufficient nickel compound to supply from about 0.1 to 0.5 lb./acre of nickel expressed as nickel metal in combination with from about 1 to 5 lb./acre of the metal salt of ethylenebisdithiocarbamic acid.

While it is not necessary to use a surfactant to enhance wetting of the plant surfaces and the spreading of the nickel compounds on these surfaces, preferred compositions employ a suitable surfactant. Care must be taken to choose a surfactant which will not react with the nickel compound and, in general, non-ionic surfactants have proven to be the preferred class. Typical of such non-ionics are alkylphenoxypolyethoxyethanols containing from about 6 to 10 ethoxy units per molecule. Similarly useful are polymeric non-ionic surfactants such as prepared by reacting alkylphenol formaldehyde condensates with ethylene oxide as described in U.S. Patent 2,454,541. Surfactants based on water-soluble phthalic anhydride-glycerol alkyd resin condensates are also suitable. Examples of other suitable surfactants include salts of the alkyl and alkaryl sulfonates, such as Du Pont MP 189 and Nacconol-NR, alkyl sulfates, such as Dreft, alkylamide sulfonates, such Igepon-T, the fatty acid esters of polyhydric alcohol, such as Span, the ethylene oxide addition products of such esters, as for example Tween, and the addition products of long-chain mercaptans and ethylene oxide, such as Sharples Non-Ionic–218. Still other surface-active agents can be employed, the above merely showing a representative list of the more common materials.

It is frequently desirable to employ dispersing agents, as contrasted with surfactants or emulsifying agents, particularly with those nickel salts which exist as essentially insoluble pulverizable solids. Since many dispersing agents do not affect appreciably the surface tension of water, combinations of dispersing agents and surfactants to facilitate dispersion of the solid nickel compound and to facilitate wetting and spreading on the plant hosts are desirable. Examples of dispersing agents include condensed formaldehyde naphthalene sulfonates, such as Tamol N and Daxad 11, and sodium lignosulfonate, such as Marasperse CB. Still other dispersing agents can be employed, the above merely showing a representative list of the more common materials.

The phytotoxic effects of nickel compounds to be used as eradicants and/or controllants must also be carefully evaluated, since rust eradication, regardless of how complete, would be valueless if there were substantial plant damage. This is not an easy property to assess, since so many factors other than the specific effect of the nickel compound can influence markedly the degree of phytotoxic damage. Thus the highest non-phytotoxic concentration of nickel compound which can be employed depends on such factors as the species of host, environmental conditions at the time of application and immediately thereafter, the stage of growth of the plant host, the nutritional status of the plant host, the water balance in the plant, etc. For instance, as might be expected, it has been found that the resistance to phytotoxic damage of young green plants is appreciably less than the resistance of older plants of the same species which invariably have lower moisture content. Furthermore, the method of application of the nickel compounds and the type of formulation in which they are employed can have pronounced effects on the phytotoxicity. Especially in organic nickel compounds, the organic radical associated with the nickel in the compound can contribute independently to the overall plant injury. In some cases, organic nickel complexes can decompose or degrade after application to the plant hose to yield phytotoxic fragments. The effects of these factors is shown in subsequent examples.

It has been shown in field tests that it is possible to increase yields very appreciably despite the fact that there may be some phytotoxic damage. In other words, some degree of phytotoxic damage may be permissible since it is possible to have some phytotoxic damage and still obtain higher yields than if no rust eradication had been effected. Furthermore, while it is undoubtedly true that this increase in yield is due in good part to the eradication of the rust pthogen and the ensuing beneficial effects on the growth of the host plant, the prevention of loss of grain yield during mechanical harvesting is frequently also important. From an economic standpoint it is obviously necessary that the cost of the eradicant treatment must be more than off-set by the increased yield which results from said treatment.

The water soluble nickel compounds can be dissolved in water and applied directly to the cereal crop being treated. It is, however, desirable in most cases to add to the solutions a wetting agent in order to facilitate spreading and wetting of the foliage. Wetting agents such as Triton B–1956 (a modified phthalic glycerol alkyd resin), Triton X–114 (octylphenoxypolyethoxyethanol having 6 to 9 ethoxy units) and Triton X–100 (octylphenoxypolyethoxyethanol averaging 10 ether groups) may be used.

The insoluble nickel amine complexes may be formulated for sprays or for dusts with the aid of a diluent or carrier. For the preparation of sprays for agriculture or horticultural use, the compound may be dissolved in a petroleum solvent such as xylene, or a mixture of solvents, together with an emulsifying agent which permits dispersion of the rust eradicant preparation in water. Water wettable powders may be prepared by taking up the compound, after dissolving in petroleum solvent, with a finely divided solid, such as magnesium aluminum silicate or other acceptable carriers. Wetting agents, sticking agents or dispersing agents may be used in such mixtures and/or sprays. The compound taken up with a finely divided solid may also be used for application as a dust.

A typical composition suitable for use as an agricultural spray may be prepared by dissolving 25 parts of bis[N-(hydroxyethyl)dodecylbenzylamine] nickel II chloride in 70 parts of aromatic solvent such as xylene. This solution becomes self-emulsifying on the addition of 5 parts of Triton WR–1339, the latter being described in Example 1, U.S. Patent 2,454,541. Such a composition tested in the greenhouse gave protection and eradication of rye rust when a concentration of ½ pound active ingredient per 100 gallons of water was used at the rate of 10 ml. per 4 inch pot containing 50 plants. This compound also demonstrated good protection and eradication under field conditions.

When employing aqueous media for the purposes of applying the nickel compounds of the present invention for rust eradication purposes, it has been observed that the pH of the aqueous medium can affect the order of activity of the nickel compound. Thus, in general, higher orders of activity are observed when employing aqueous media the pH of which is in the range of about 2 to about 8, and this higher order of activity can make possible a reduction in the amount of nickel compound required. This suggests the use of buffering agents for optimum pH control for a given nickel compound.

GREENHOUSE TESTS

The methods of conducting greenhouse tests will vary somewhat from plant species to plant species, and will vary somewhat depending on the type of rust used. However, all the tests are basically the same, and the following greenhouse test conditions for leaf brown rust of rye (*Puccinia rubigo-vera secalis*) gives the basic conditions employed:

The rye seeds are planted in 4 inch diameter pots, an average of approximately 60 seeds per pot. The plants are tested when they are 10 days old, at which time they are approximately 4 to 4½ inches high. (If the plants are higher they can be cut to 4 inches without affecting the test.) Two replications are employed for each concentration of nickel compound tested.

The rust is kept in stock on growing rye plants, and the uredospores are ready for utilization any time after 14 days from the inoculation of the plants. A spore suspension for the inoculation of the test plants is prepared as follows:

A nutritive solution consisting of 0.1% sucrose plus 0.001% potassium citrate plus 5% of Triton NE (an alkylphenoxypolyethoxyethanol) at a dilution of 1:2000 (for better suspension of the spores) is prepared. The uredospores are scraped from the stock plants into the nutritive solution and a spore count (using a Levy count chamber) is made and, on the basis of this count, the spore number is adjusted to 25,000 per ml.

For the protectant test the plants are sprayed with the nickel-containing composition and allowed to dry for 2 to 3 hours. They are then sprayed with the spore suspension and held for 24 hours at 68° F. and 100% relative humidity after which they are allowed to stand in the greenhouse under carefully controlled conditions. A reading at a later date (frequently 12 days after inoculation) of the average number of pustules on the treated and untreated plants enables one to determine the effectiveness of the protectant action of the nickel compounds tested.

To determine the eradicant effect, the plants are inoculated and after the rust has begun to appear on the plants, generally 5 days after inoculation, the plants are sprayed with the nickel compound-containing composition. Several days thereafter (frequently 7 days after the nickel compound-containing composition has been applied), a reading is taken on the treated and untreated plants, and the degree of eradication determined.

| Average Rust Eradication Rank | Sori/Pot of about 50 Plants |
|---|---|
| 0 | None |
| 0.25 | 1-5 |
| 0.5 | 6-20 |
| 0.75 | 21-50 |
| 1.0 | 51-100 |
| 2.0 | 101-200 |
| 3.0 | 201-500 |
| 4.0 | 501-1,000 |
| 5.0 | >1,000 |

A value of 1.0 or less indicates that the nickel compound exhibits very good rust eradication in greenhouse tests and that this degree of eradication is more than adequate to prevent serious damage to the plant.

AVERAGE RUST ERADICATION RANGE AND PHYTOTOXICITY TO RYE PLANTS OF VARIOUS NICKEL COMPOUNDS

As described hereinabove, screening tests were conducted on a large number of widely different nickel compounds under greenhouse conditions. As also described, the more effective or more promising compounds were field tested under practical conditions. In the following table the concentration refers to the number of grams or pounds of active ingredient per hundred gallons of spray. This hundred gallon figure was chosen to represent the amount sprayed per acre of regularly planted rye plants. The method of obtaining the value for the average rust rank (eradicant test) is described in detail hereinabove. The results of the greenhouse tests were as follows:

| Compound | Concentration | Injury | Avg. Rust Rank (Eradicant Test) |
|---|---|---|---|
| Nickel chloride hexahydrate | 804 g | Moderate + | 0.0 |
| | 704 g | Moderate to severe | |
| | 560 g | Moderate + | 0.0 |
| | 402 g | Slight | 0.0 |
| | 201 g | Very slight | 0.08 |
| | 140 g | do | 0.08 |
| | 70 g | do | 0.42 |
| | 50 g | None | 0.83 |
| | 25 g | do | 3.33 |
| Bis [N-(hydroxyethyl) dodecylbenzylamine] nickel II chloride. | 4 lbs | Severe, some plants dead | |
| | 2 lbs | Moderate to severe | |
| | 1 lb | Slight to moderate | 0.125 |
| | ½ lb | Slight | 1.0 |
| Bis (ethyl acetoacetato) nickel II | ½ lb | Slight | 0.0 |
| | ¼ lb | None | 0.375 |
| Nickel glycinate | ½ lb | Very slight | 0.0 |
| | ¼ lb | None | 0.5 |
| Nickel acrylate | ¼ lb | Very slight | 0.0 |
| | ⅛ lb | do | 0.625 |
| Bis (3-amino-1,2,4-triazole) nickel II chloride | ½ lb | Moderate to severe | 2.5 |
| | ¼ lb | Moderate + | 3.5 |
| | ⅛ lb | do | 5.0 |
| Nickel 2,4-dinitro-6-cresolate | ½ lb | Moderate to severe | 0.5 |
| | ¼ lb | Moderate + | 2.5 |
| | ⅛ lb | Slight + | 5.0 |
| Nickel fluoborate | 1 lb | Moderate + | 0.0 |
| | ½ lb | Slight to moderate | 0.125 |
| | ¼ lb | Slight | 0.0 |
| Nickel chloride hexahydrate + ammonium hydroxide (15.1 N) [(tetraamino) nickel II chloride]. | ½ lb.+254.4 g | Very slight | 0.5 |
| | ¼ lb.+127.2 g | do | 0.5 |
| Zinc ethylene bisdithio-carbamate + nickel chloride hexahydrate. | ½ lb.+201 g | do | 0.08 |
| | ¼ lb.+150 g | do | 0.17 |
| | ½ lb.+100 g | None | 0.33 |
| | | Very slight to slight | 0.375 |
| Nickel 8-hydroxyquinolinate | 32 lbs | Very slight | 1.5 |
| | 16 lbs | do | 5.0 |
| | 8 lbs | do | 5.0 |
| | 4 lbs | None | 5.0 |
| | 2 lbs | do | 5.0 |
| | 1 lb | do | 2.0 |
| Bis (kojato) nickel | 4 lbs | do | 4.5 |
| | 2 lbs | do | 5.0 |
| | 1 lb | do | 0.75 |
| Bis (salicylaldehydo) nickel II | 4 lbs | do | 3.0 |
| | 2 lbs | do | 4.0 |
| | 1 lb | do | 2.0 |
| Nickelous β-(ethylenethioureido) ethyldithiocarbamate. | 32 lbs | Slight + | 2.0 |
| | 16 lbs | Very slight | 4.0 |
| | 8 lbs | do | 5.0 |
| | 4 lbs | None | 5.0 |
| | 2 lbs | do | 5.0 |
| | 1 lb | do | 0.5 |
| Nickelous 4-chloroanilinomethanesulfonate | 32 lbs | Moderate to severe | 0.875 |
| | 16 lbs | Slight to moderate + | 3.0 |
| | 8 lbs | Very slight to slight | 4.0 |
| | 4 lbs | Very slight | 5.0 |
| | 2 lbs | None | 5.0 |
| | 1 lb | do | 0.875 |
| Nickelous α-carboxymethylmercapto-β-(2-furyl) acrylate. | 4 lbs | do | 4.0 |
| | 2 lbs | do | 5.0 |
| | 1 lb | do | 0.12 |
| Tris(thiourea) nickel II chloride | ½ lb | Very slight | 0.87 |
| | ¼ lb | None | 0.0 |
| Nickel sulfamate | ½ lb | Slight | 0.5 |
| | ¼ lb | Very slight | 0.0 |
| Nickel sulfanilate | 1 lb | do | 0.37 |
| | ½ lb | None | 0.0 |
| Bis[N-(hydroxyethylmethyl) dodecylbenzylamine] nickel II chloride. | 1 lb | Slight to moderate | 0.125 |
| | ½ lb | Slight | 0.75 |
| | ¼ lb | None | 3.0 |
| Nickel α-methyl-α-chloro-β-chloropropionate | ¼ lb | do | 5.0 |
| | ⅛ lb | do | 0.12 |
| Bis[N-(hydroxyethylbutyl) dodecylbenzylamine] nickel II chloride. | 1 lb | do | 0.87 |
| | ½ lb | do | 0.87 |
| Bis[N-(hydroxypropyl) dodecylbenzylamine] nickel II chloride. | 1 lb | do | 3.5 |
| | ½ lb | Very slight | 0.5 |
| Bis(acetylacetono) nickel II | ¼ lb | None | 2.3 |
| Bis(2-hydroxydecanato) nickel | ½ lb | Very slight | 0.75 |
| | ¼ lb | do | 2.0 |

| Compound | Concentration | Injury | Avg. Rust Rank (Eradicant Test) |
|---|---|---|---|
| Nickel trichloroacetate | ½ lb | Very slight | 0.87 |
|  | ¼ lb | None | 3.0 |
|  | ⅛ lb | do | 5.0 |
| Nickel bis(2,4-dichlorophenoxy acetate) | ½ lb | do | 0.75 |
|  | ¼ lb | do | 2.5 |
|  | ⅛ lb | do | 5.0 |
| Nickel acetate tetrahydrate | ½ lb | Very slight | 0.12 |
|  | ¼ lb | do | 0.5 |
| Nickel carbonate | ½ lb | do | 0.7 |
|  | ¼ lb | do | 2.0 |
| Nickel citrate | ½ lb | do | 0.87 |
|  | ¼ lb | None | 1.5 |
|  | ¼ lb | do | 4.0 |
| Nickel cyanide | ¼ lb | do | 5.0 |
| Nickel fluoride | ½ lb | Very slight | 0.37 |
|  | ¼ lb | None | 0.62 |
|  | ¼ lb | do | 4.0 |
| Nickel hydroxide | ¼ lb | do | 5.0 |
| Nickel nitrate hexahydrate | ½ lb | Very slight | 0.12 |
|  | ¼ lb | None | 0.75 |
| Nickel sulfate hexahydrate | ½ lb | Very slight | 0.37 |
|  | ¼ lb | None | 0.62 |
| Nickel sulfide | ½ lb | Very slight | 0.5 |
|  | ¼ lb | None | 0.87 |
| Nickel bromide | ½ lb | Very slight | 0.0 |
|  | ¼ lb | None | 0.5 |
| Nickel formate dihydrate | ½ lb | Slight | 0.0 |
|  | ¼ lb | None | 0.6 |
| Nickel ethylsulfate | ½ lb | Very slight | 0.5 |
|  | ¼ lb | do | 0.75 |
| Nickelous benzothiazyl-thioglycolate | ½ lb | Slight | 1.5 |
|  | ¼ lb | Very slight | 4.5 |
| Nickelous alphamercapto-cinnamate | ½ lb | do | 1.5 |
|  | ¼ lb | do | 4.0 |
| Nickelous ethylenediamine N,N,N',N'-tetramethane sulfonate | ½ lb | Slight | 0.25 |
|  | ¼ lb | Very slight | 0.625 |
| Nickelous dimethyldithio-carbamyl acetate | ½ lb | Slight | 0.375 |
|  | ¼ lb | Very slight | 0.875 |
| Bis[N-(4-chlorophenyl)N',N' dimethylurea] nickel II chloride | ½ lb | Moderate + | 0.0 |
|  | ¼ lb | Slight to moderate | 0.5 |
|  | ⅛ lb | Slight | 0.75 |
| Bis(ethylenediamine) nickel II chloride | ½ lb | Very slight | 0.5 |
|  | ¼ lb | None | 0.83 |
| Bis[N-(2-hydroxyethyl)-N-methyldodecylbenzylamine] nickel II chloride | 1 lb | Slight to moderate | 0.0 |
|  | ½ lb | Slight | 0.125 |
| Manganese ethylene bisdithio-carbamate plus nickel chloride hexahydrate | ½ lb.+201 gms. | Very slight | 0.0 |
| Nickel salicylate | ½ lb | None | 0.125 |
|  | ¼ lb | do | 0.5 |
| Bis N-(p-nitrophenyl)3,4-dichlorobenzene sulfonamido | ¼ lb | Very slight | 1.0 |
|  | ⅛ lb | Slight + | 0.25 |
| Bis[N,N-di(2-hydroxyethyl) dodecylmethylbenzylamine] nickel II chloride | 1 lb | None | 1.0 |
|  | ½ lb | do | 3.0 |
| Bis[N-(p-nitrophenyl)3,4-dichlorobenzenesulfonamido] nickel | 1 lb | do | 2.5 |
|  | ½ lb | do | 2.5 |
| Bis[N-(n-dodecyl)1,3,propane-diamine] nickel II chloride | 1 lb | Very slight | 2.5 |
|  | ½ lb | do | 3.0 |
| Bis(N-dodecylmethylbenzyl-ethylene diamine nickel II chloride | 1 lb | None | 3.0 |
|  | ½ lb | do | 4.0 |
| Bis[di-(dodecylmethylbenzyl)2-hydroxyethylamine] nickel II chloride | 1 lb | do | 1.0 |
|  | ½ lb | do | 4.0 |
| Bis[N-(5,5,7,7-tetramethyl-2-octenyl)2-hydroxyethylamine] nickel II chloride | 1 lb | Slight | 0.875 |
|  | ½ lb | Very slight | 1.5 |
| Bis[N,N-di(2-hydroxyethyl)5,5,7,7-tetramethyl-2-octenyl-amine] nickel II chloride | 1 lb | Slight | 0.625 |
|  | ½ lb | None | 2.0 |
| Untreated |  |  | 5.0 |

FIELD TESTS

Since, as has been indicated, so many factors such as climatic conditions can affect the effectiveness of nickel compounds and also affect the rate of rust development, it is necessary to conduct a large number of tests before reliable values can be obtained. Furthermore, there are several methods for determining the actual degree of rust infestation of plants, two of the more commonly used methods being described as follows:

RUST PUSTULE ERADICATION COUNT

A predetermined number of leaves are picked from a given position on the plant. The number of leaves picked per replication usually depends upon the size of the test plot and the time available to make the counts. In any event the number of leaves picked at random should be sufficient to be representative of the entire plot. Each pustule on these leaves is assigned to either the eradicated or healthy group. From these data the percentage of total pustules eradicated can easily be calculated.

U.S. DEPT. OF AGRICULTURE SCALE

In this method, a chart showing diagrams of the leaf sections with pustules is used for comparison with the actual leaf being evaluated (for details of the U.S. Dept. of Agr. diagrams, see U.S. Dept. of Agriculture Bulletin, No. 1046). The third inch of the leaf measured from the apical end or tip is compared with the chart and the appropriate diagram showing a comparable number and size of pustules is selected, and the U.S.D.A. scale is read directly from the chart. The following tabulation gives the correlation between the arbitrary rating and the actual percent area occupied by rust pustules:

| Rating, U.S.D.A.-Scale | Actual Percent Area Occupied by Rust Pustules |
|---|---|
| 1 | 0.37 |
| 5 | 1.85 |
| 10 | 3.70 |
| 20 | 7.40 |
| 30 | 11.10 |
| 40 | 14.80 |
| 50 | 18.50 |
| 60 | 22.20 |
| 70 | 25.90 |
| 80 | 29.60 |
| 90 | 33.30 |
| 100 | 37.00 |

This method of evaluation works well for the pustules which are present on the leaf, but gives no indication of the actual number of pustules which have been eradicated. Therefore the number of pustules showing evidence of eradication are estimated and recorded as percentage of total pustules which have been eradicated.

DETERMINATION OF PHYTOTOXICITY OR DEGREE OF PLANT INJURY

This particular value must be determined by estimation of the areas of the plant (particularly the leaf areas) which have suffered damage due to the application of the nickel compound. Because of the difficulty in estimating these values with a relatively good degree of accuracy, multiple samples must be estimated and averaged and compared versus a control or untreated plant. The following descriptive ratings of phytotoxic damage have been employed in these tests:

Severe
Moderate to severe
Moderate plus
Moderate
Slight to moderate
Slight plus
Slight
Very slight
None The value of slight plus is considered to be an acceptable level of plant injury. In comparing greenhouse data versus field test results it should be remembered that, in general, field-grown plants are much less susceptible to phytotoxic damage than are those grown in a greenhouse.

Typical field test data on a variety of nickel compounds are presented hereinafter.

The data of Tables I and II were obtained in tests conducted in a Kansas wheat growing area. Treatments were applied in a randomized block design with four replications. Each plot was 40 feet long and 5 feet wide. There were 2 feet of buffer between each plot. Cheyenne wheat was the test crop.

The treatments were applied for the first time in late spring. Nine days later the treatments were again applied but to only one-half of each plot, thereby affording a comparison of one application with a double application. Percent rust (using U.S.D.A. scale) was determined seventeen days after the second application, and the yield determinations were made nineteen days after the rust determination.

*Table I.—Percent leaf rust (telial stage) on flag leaves*

[Rated using U.S.D.A. scale]

| Compound | One Application (40 gal./acre) | Two Applications (two 40 gal/acre) |
| --- | --- | --- |
| Compound 1 (1 lb./acre) | 24.7 | 4.5 |
| Compound 1 (2 lb./acre) | 22.3 | 0.6 |
| Compound 2 (equivalent to 0.125 lb. of nickel as metal per acre) | 44.1 | 24.2 |
| Compound 2 (equivalent to 0.25 lb. of nickel as metal per acre) | 42.4 | 20.5 |
| Compound 3 | 7.5 | 1.2 |
| Compound 4 | 1.1 | 0.1 |
| Untreated | 58.4 | 62.1 |

Compound 1 was bis[N-(hydroxyethyl)dodecylbenzylamine] nickel II chloride.
Compound 2 was nickel chloride hexahydrate.
Compound 3 was a mixture of zinc ethylenebisdithiocarbamate at 1.425 lb./acre, and nickel chloride hexahydrate equivalent to 0.125 lb. nickel as metal per acre.
Compound 4 was a mixture of zinc ethylenebisdithiocarbamate at 2.85 lb./acre, and nickel chloride hexahydrate equivalent to 0.25 lb. nickel as metal per acre.

*Table II.—Yield determinations*

[Weight in grams from 150 heads of wheat]

| Compound | One Application (40 gal./acre) | Two Applications (two 40 gal/acre) |
| --- | --- | --- |
| Compound 1 (1 lb./acre) | 92.0 | 101.8 |
| Compound 1 (2 lb./acre) | 91.8 | 99.5 |
| Compound 2 (equivalent to 0.125 lb. of nickel as metal per acre) | 95.8 | 94.5 |
| Compound 2 (equivalent to 0.25 lb. of nickel as metal per acre) | 95.5 | 93.5 |
| Compound 3 | 103.0 | 115.8 |
| Compound 4 | 109.3 | 114.8 |
| Untreated | 87.3 | 84.8 |

Compound 1 was bis[N-(hydroxyethyl)dodecylbenzylamine] nickel II chloride.
Compound 2 was nickel chloride hexahydrate.
Compound 3 was a mixture of zinc ethylenebisdithiocarbamate at 1.425 lb./acre, and nickel chloride hexahydrate equivalent to 0.125 lb. nickel as metal per acre.
Compound 4 was a mixture of zinc ethylenebisdithiocarbamate at 2.85 lb./acre, and nickel chloride hexahydrate equivalent to 0.25 lb. nickel as metal per acre.

The data of Table III below were obtained in tests conducted in a midwestern Canadian wheat growing area. Treatments were applied in a randomized block design. Red Bobs wheat was the test crop. Plots consisted of four 21 foot long rows and were separated from one another by four buffer rows.

Sprays were applied in late summer by means of a three gallon Hudson knapsack sprayer at fifty gallons per acre. A surfactant of the alkylphenoxypolyethoxyethanol type was used in a ratio of 1:1000 by weight of water. The determination of the relative rust eradication was made five days later. The description on the relative rust eradication values is given in the footnote, Table III.

*Table III*

| Compound | Relative Eradication |
| --- | --- |
| Nickel glycinate | 2.5 |
| Bis(ethylacetoacetato) nickel | 1.8 |
| Nickelous ethylenediamine-N,N,N¹,N¹-tetramethane sulfonate | 2.5 |
| Nickel chloride hexahydrate plus ammonium hydroxide | 3.0 |
| Nickel acrylate | 2.3 |
| Nickel citrate | 1.5 |
| Compound 1 | 2.5 |
| Compound 2 | 2.5 |
| Untreated | 0 |

Relative rust eradication is based as follows: 1=fair eradication; 2=good eradication; 3=excellent eradication.
All treatments were applied at the rate of 1.67 lbs. of compound per acre using 50 gallons of aqueous spray per acre as previously described.
Compound 1 is bis[N-(hydroxyethyl)dodecylbenzylamine] nickel II chloride applied as a dust.
Compound 2 is the same compound as compound 1 but was applied from solution.

The data presented hereinafter were obtained from rust eradication field trials conducted in a midwestern wheat growing area. At the time the nickel compounds were applied to the wheat plants they were so severely rust infected that it was realized that not only would the yield of grain and the quality of the grain be seriously affected even if 100% eradication were obtained, but it was also realized that the results could not be considered representative. Nevertheless, the tests were conducted to see if any beneficial results would be obtained with such a heavily infected crop. The Plot Weight represents the total yield of straw and grain obtained from various plots. The grain yield represents the weight of the cereal grain only.

Table IV

| Compound | Plot Weight (Straw and grain, grams) | Grain Yield (grams) |
| --- | --- | --- |
| Compound 1 | 2,767 | 220.25 |
| Compound 2 | 2,537.75 | 127.75 |
| Compound 3 | 2,838.75 | 224.00 |
| Untreated | 2,110.25 | 115.00 |

Compound 1 was bis[N-(hydroxyethyl)dodecylbenzylamine] nickel II chloride applied at 2 lb./acre.

Compound 2 was nickel chloride hexahydrate employed at a rate equivalent to 0.25 lb. nickel as metal per acre.

Compound 3 was a mixture of zinc ethylenebisdithiocarbamate (at 2.85 lb. per acre) and nickel chloride hexahydrate (equivalent to 0.25 lb. nickel as metal per acre).

The following examples represent typical formulations:

EXAMPLE 1.—TANK MIX—NICKEL CHLORIDE AND ZINC ETHYLENEBISDITHIOCARBAMATE

A typical formulation is as follows, all weights being per 100 gallons of water:

Zinc ethylenebisdithiocarbamate _____lb____ 2
Nickel chloride hexahydrate _____lb____ 0.5
Triton X-114 (alkylphenoxypolyethoxyethanol) _____oz____ 5

EXAMPLE 2.—WETTABLE POWDER—NICKEL CHLORIDE AND ZINC ETHYLENEBISTHIOCARBAMATE

This wettable powder was prepared as follows:

lb.
Zinc ethylenebisdithiocarbamate _____ 65
Micropulverized nickel chloride hexahydrate _____ 33
Triton X-120 (alkylphenoxypolyethoxyethanol) ___ 2

The zinc ethylenebisdithiocarbamate and the micropulverized nickel chloride hexahydrate were thoroughly mixed and the Triton X-120 then added. Mixing was continued until a homogeneous blend was obtained and the blend so obtained was then micropulverized.

EXAMPLE 3.—TANK MIX—BIS[N-(2-HYDROXYETHYL) DODECYLMETHYLBENZYLAMINE] NICKEL II CHLORIDE

This tank mix was prepared as follows, all weights being per 100 gallons of water:

Bis[N-(2-hydroxyethyl) dodecylmethylbenzylamine] nickel II chloride _____lb__ 0.5
Acetone _____gal__ 1
Triton B-1956 (water soluble phthalic anhydride-glycerol alkyd resin) _____oz__ 5

The nickel compound was dissolved in acetone and the acetone solution added to the water containing the Triton B-1956.

EXAMPLE 4.—EMULSION CONCENTRATE—BIS[N-(2-HYDROXYETHYL) DODECYLMETHYLBENZYLAMINE] NICKEL II CHLORIDE

The emulsion concentrate was prepared as follows:

lb.
Bis[N-(2-hydroxyethyl) dodecylmethylbenzylamine] nickel II chloride _____ 25
Xylene _____ 70
Triton WR-1339 (polymeric non-ionic surfactant of column 10, line 12 of this specification) _____ 5

The nickel compound was dissolved in xylene and the Triton WR-1339 subsequently incorporated with adequate agitation. This emulsion concentrate is self-emulsifying when mixed with water.

EXAMPLE 5.—EMULSION CONCENTRATE—NICKEL OLEATE

This concentrate was prepared in the following manner:

lb.
Nickel oleate _____ 10
Xylene _____ 85
Triton WR-1339 (see Example 4) _____ 5

The nickel oleate was dissolved in the xylene and the Triton WR-1339 added subsequently with adequate agitation. This composition is self-emulsifying when added to water.

EXAMPLE 6.—DUST—NICKEL SULFIDE

A suitable compound for application as a dry powder can be prepared in the following manner:

lb.
Nickel sulfide _____ 5
Pyrophyllite (a hydrous aluminum silicate) _____ 95

The nickel sulfide and the pyrophyllite were mixed until the blend was essentially homogeneous, and the resulting blend was subsequently micropulverized.

EXAMPLE 7.—DRY POWDER FOR AQUEOUS SUSPENSION—NICKEL SULFIDE

This compound is prepared as follows:

lb.
Nickel sulfide _____ 5
Pyrophyllite (a hydrous aluminum silicate) _____ 90
Tamol N (the sodium salt of a condensed formaldehyde naphthalene sulfonate) _____ 3
Triton X-120 (alkylphenoxypolyethoxyethanol) _____ 2

The nickel sulfide and the pyrophyllite were blended until an essentially homogeneous blend was obtained. Mixing was continued and the Tamol N and Triton X-120 added. The resultant homogeneous blend was micropulverized. When added to water under agitation, this composition forms a stable aqueous suspension, the Tamol N acting as a dispersing agent and the Triton X-120 acting as a surfactant to improve the wetting and spreading properties of the suspension on leaves of the plant host.

EXAMPLE 8.—AQUEOUS SOLUTION—NICKEL CHLORIDE

The solution is prepared as follows, all quantities being per 100 gallons of water:

lb.
Nickel chloride hexahydrate _____ 0.5
Triton B-1956 (water soluble phthalic anhydride-glycerol alkyd resin) _____ 0.3

These two materials were added to water with adequate agitation. The Triton B-1956 acts as a wetting and spreading agent and Triton X-114 may be substituted for it in the same quantity.

EXAMPLE 9.—AQUEOUS SOLUTION—NICKEL CHLORIDE

This solution was prepared as follows, all weights being per 100 gallons of water:

Nickel chloride hexahydrate_____lb__ 0.5
Trimethylamine salt of melamineformaldehyde-alkyd resin_____lb__ 1
Triton X-114 (alkylphenoxyethoxyethanol) _____oz__ 5

The nickel chloride hexahydrate and the Triton X-114 were mixed, and as soon as the solution was homogeneous, the resin was slowly added with adequate agitation. The resin functions as an adherent or sticking agent, improving appreciably the tenacity of the highly soluble nickel chloride.

When each of glycerol, dried skim milk and starch were substituted for the resin, similar improvements in the tenacity of the nickel chloride were observed.

EXAMPLE 10.—DUST—NICKEL CHLORIDE

A suitable compound for application of a dry dust employing a highly soluble compound can be prepared as follows:

Lb.
Nickel chloride hexahydrate_____ 2.5
Diluex (magnesium aluminum silicate)_____ 50
Pyrophyllite (a hydrous aluminum silicate)_____ 47.5

The nickel chloride hexahydrate was dissolved in a minimum of water (approximately 1 lb. of hexahydrate to 2 lbs. of water) and the Diluex added slowly with agitation. Mixing was continued and the pyrophyllite added. The resulting mass was then micropulverized to the desired degree of fineness. A preferred rate of application of this compound under normal conditions is about 20 to about 40 lbs. per acre.

EXAMPLE 11.—AQUEOUS SOLUTION—NICKEL NITRATE PLUS ACRYLIC TERPOLYMER STICKER

Solutions of this type were prepared as follows, all weights being per 100 gallons of water:

| | |
|---|---|
| Nickel nitrate | lb__ 0.5 |
| Acrylic terpolymer (50% solids in water) | lb__ 2 |
| Triton X-114 | oz__ 5 |

The nickel nitrate was dissolved in water and the Triton X-114 added thereto. The acrylic terpolymer dispersion was added slowly while the solution was being slowly agitated.

The acrylic terpolymer was a terpolymer of ethyl acrylate (25%), methyl methacrylate (73%), and a minor proportion (2%) of methacrylic acid (all percentages are weights percent). The terpolymer functions as an adherent or sticking agent for the soluble nickel salt, appreciably improving the tenacity thereof.

Comparable improvements in tenacity were obtained when a vinyl acetate-ethylacrylate copolymer was substituted for the acrylic terpolymer.

EXAMPLE 12.—WETTABLE POWDER—NICKEL SULFIDE AND DIAMMONIUM ETHYLENE BISDITHIOCARBAMATE

This powder contained:

| | Lb. |
|---|---|
| Diammonium ethylenebisdithiocarbamate | 50 |
| Micropulverized nickel sulfide | 48.5 |
| Triton X-120 (alkylphenoxypolyethoxyethanol) | 1.5 |

The diammonium ethylenebisdithiocarbamate and Triton X-120 are added with thorough agitation to a slurry of the nickel sulfide in 100 gallons of water and homogeneously mixed. The mixture is then spray dried and micropulverized.

The following examples set forth typical preparations of representative aminoalcohol nickel salt complexes which were discussed in the foregoing specification:

EXAMPLE 13.—BIS[N - (2 - HYDROXYETHYL) - 2,4 - DI-N-PROPYLBENZYLAMINE] NICKEL II CHLORIDE 23.5 parts of N - (2 - hydroxyethyl) - 2,4 - di - n - propylbenzylamine was poured onto 13.0 parts of powdered nickel chloride. The mixture was stirred at 100° C. until the nickel chloride had dissolved. A green viscous complex was obtained which was crystallized from methanol.

EXAMPLE 14.—BIS[N - (2 - HYDROXYETHYL)4-OCTYL-BENZYLAMINE] NICKEL II CHLORIDE

A solution of 42.4 parts (0.16 mole) of N-(2-hydroxyethyl)-4-octylbenzylamine in 33.2 parts of ethanol was added to a solution of 10.0 parts (0.08 mole) of nickel chloride hexahydrate in 89.6 parts of ethanol. The complex formed immediately, and a dark green solution resulted. The complex was employed as the ethanolic solution for compounding rust eradicant compositions.

EXAMPLE 15.—BIS[N - (3 - HYDROXYPROPYL) - 4 - DO-DECYLBENZYLAMINE] NICKEL II CHLORIDE

A solution of 33.5 parts of N-(3-hydroxypropyl)-4-dodecylbenzylamine in 50 parts of ethanol was added to a solution of 11.8 parts of nickel chloride hexahydrate in 50 parts of ethanol. There was obtained a dark brown solution which, upon removal of the ethanol, yielded an amorphous brown material. The brown amorphous product was insoluble in water but soluble in acetone.

While in the foregoing specification and examples there has been set forth in considerable detail certain embodiments of the present invention, it will be understood by those skilled in the art that considerable variation can be made in such detail without departing from the spirit of the invention.

What is claimed is:

1. The process of eradicating rust pathogens on a living plant host which comprises contacting aboveground portions of a rust-infested plant host with a nickel compound in an amount sufficient to provide effective rust eradication without substantial phytotoxic damage to said plants, said nickel compound being selected from the group consisting of inorganic nickel salts; nickel salts of fatty acids containing up to about 18 carbon atoms; nickel salts of organic acids containing up to about 6 carbon atoms and selected from the group consisting of hydroxy acids, halogen substituted fatty acids, and thiocarboxylic acids; nickel salt complexes of the formula:

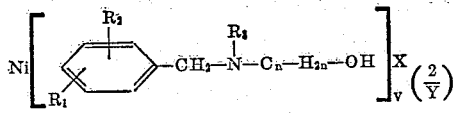

in which $R_1$ is alkyl containing from 4 to 18 carbon atoms, $R_2$ is selected from the group consisting of hydrogen and lower alkyl, $R_3$ is selected from the group consisting of hydrogen, lower alkyl and 2-hydroxyethyl, X is an anion, $n$ is an integer of from 2 to 3, Y is the valence of the anion X, and V is an integer of from 1 to 2; and complexes of inorganic nickel salts with a member of the group consisting of ammonia, alkylamines, alkylene polyamines, hydroxy alkylamines, arylamines and aralkylamines.

2. The process of claim 1 in which the amount of nickel compound used for contacting said rust-infected plant hosts provides protection against subsequent rust reinfection.

3. The process of claim 1 in which the nickel compound employed per acre of regularly planted plant host provides from about 0.02 to about 4 pounds of nickel expressed as nickel metal.

4. The process of claim 1 in which the nickel compound employed per acre of regularly planted plant host provides up to about 0.5 pounds of nickel expressed as nickel metal.

5. A composition containing as principal active ingredients a metal salt of ethylenebisdithiocarbamic acid and an inorganic nickel salt of a minimum aqueous solubility of 1.0 gr./100 ml., the ratio by weight of said metal salt of alkylenebisdithiocarbamic acid to said inorganic nickel salt being from about 1:1 to about 4:1.

6. The composition of claim 5 wherein said inorganic nickel salt is nickel chloride.

7. The composition of claim 5 wherein said inorganic nickel salt is nickel sulfate.

8. The composition as claimed in claim 5 including a minor proportion by weight of a surfactant which is chemically non-reactive with the constituents of said composition.

9. The composition of claim 8 in which said surfactant is non-ionic.

10. The composition of claim 9 wherein said surfactant is selected from the group consisting of a water-soluble phthalic anhydride-glycerol alkyd resin, alkylphenoxypolyethoxyethanols having from about 6 to about 10 ethoxy units per molecule and adducts of an alkylphenol formaldehyde condensate and ethylene oxide.

11. The composition of claim 5 wherein said metal salt of alkylenebisdithiocarbamic acid is zinc ethylenebisdithiocarbamate.

12. The composition of claim 11 wherein said inorganic nickel salt is nickel chloride.

13. The composition of claim 11 wherein said inorganic nickel salt is nickel sulfate.

14. The process of eradicating rust pathogens on a living plant host which comprises contacting aboveground portions of rust-infected plant host with a composition containing as principal active ingredients a metal salt of alkylenebisdithiocarbamic acid and a nickel compound other than nickel alkylenebisdithiocarbamate which provides nickel expressed as nickel metal equivalent to from about 0.5 to about 95% by weight of the composition, the amount of said composition being sufficient to provide effective rust eradication without substantial phytotoxic damage to said plants and said nickel compound being selected from the group consisting of inorganic nickel salts; nickel salts of fatty acids containing up to about 18 carbon atoms; nickel salts of organic acids containing up to about 6 carbon atoms and selected from the group consisting of hydroxy acids, halogen substituted fatty acids, and thiocarboxylic acids; nickel salt complexes of the formula:

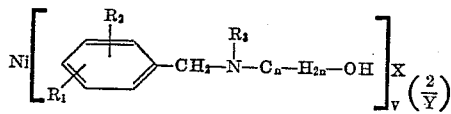

in which $R_1$ is alkyl containing from 4 to 18 carbon atoms, $R_2$ is selected from the group consisting of hydrogen and lower alkyl, $R_3$ is selected from the group consisting of hydrogen, lower alkyl and 2-hydroxyethyl, X is an anion, $n$ is an integer of from 2 to 3, Y is the valence of the anion X, and V is an integer of from 1 to 2; and complexes of inorganic nickel salts with a member of the group consisting of ammonia, alkylamines, alkylene polyamines, hydroxy alkylamines, arylamines and aralkylamines.

15. The process of claim 14 wherein the ratio by weight of said metal salt of alkylenebisdithiocarbamic acid to said nickel compound is within the range from about 1:1 to about 4:1.

16. The process of claim 15 wherein said nickel compound is nickel chloride.

17. The process of claim 15 wherein said nickel compound is nickel sulfate.

18. The process of claim 15 wherein said nickel compound is an inorganic nickel salt.

19. The process of claim 18 wherein said metal salt of alkylenebisdithiocarbamic acid is zinc ethylenebisdithiocarbamate.

20. The process of claim 19 wherein said inorganic nickel salt is nickel chloride.

21. The process of claim 19 wherein said inorganic nickel salt is nickel sulfate.

References Cited in the file of this patent

UNITED STATES PATENTS

| | | |
|---|---|---|
| Re. 23,742 | Hester | Nov. 24, 1953 |
| 2,317,765 | Hester | Apr. 27, 1943 |
| 2,457,674 | Heuberger | Dec. 28, 1948 |
| 2,545,948 | Flenner | Mar. 20, 1951 |
| 2,710,822 | Golding | June 14, 1955 |

OTHER REFERENCES

Frear: A Catalogue of Insecticides, Fungicides and Herbicides, Chronica Botanica Co., vol. II, 1948, pp. 50, 53, 25.

Frear: Chemistry of Insecticides, Fungicides and Herbicides, D. Van Nostrand, 2nd ed., 1948, pp. 280–287.

Horsfall: Principles of Fungicidal Action (1956), p. 143, Chronica Botanica Co.